United States Patent [19]
Ulrich et al.

[11] Patent Number: 6,052,735
[45] Date of Patent: Apr. 18, 2000

[54] ELECTRONIC MAIL OBJECT SYNCHRONIZATION BETWEEN A DESKTOP COMPUTER AND MOBILE DEVICE

[75] Inventors: Bryce Ulrich, Kirkland; Anthony Discolo; Salim Alam, both of Redmond, all of Wash.

[73] Assignee: Microsoft Corporation, Redmond, Wash.

[21] Appl. No.: 09/058,613

[22] Filed: Apr. 10, 1998

Related U.S. Application Data

[60] Provisional application No. 60/063,164, Oct. 24, 1997, and provisional application No. 60/064,986, Nov. 7, 1997.

[51] Int. Cl.[7] .................................................. G06F 13/42
[52] U.S. Cl. ........................... 709/236; 709/224; 709/237
[58] Field of Search ..................... 709/203, 206, 709/207, 102, 505, 236, 237; 345/335

[56] References Cited

U.S. PATENT DOCUMENTS

| | | | |
|---|---|---|---|
| 5,159,592 | 10/1992 | Perkins | 370/338 |
| 5,392,390 | 2/1995 | Crozier | 345/335 |
| 5,630,081 | 5/1997 | Rybicki et al. | 395/349 |
| 5,664,228 | 9/1997 | Mital | 710/62 |
| 5,666,530 | 9/1997 | Clark et al. | 707/201 |
| 5,684,990 | 11/1997 | Boothby | 707/203 |
| 5,701,423 | 12/1997 | Crozier | 395/335 |
| 5,706,509 | 1/1998 | Tso | 707/201 |
| 5,710,922 | 1/1998 | Alley et al. | 707/201 |
| 5,727,159 | 3/1998 | Kikinis | 709/246 |
| 5,754,306 | 5/1998 | Taylor et al. | 358/400 |
| 5,758,354 | 5/1998 | Huang et al. | 707/201 |

FOREIGN PATENT DOCUMENTS

| | | | |
|---|---|---|---|
| WO 94/15294 | 7/1994 | WIPO | 710/62 |
| WO 97/23853 | 3/1997 | WIPO | 710/62 |

OTHER PUBLICATIONS

"In Defense of the Personal Digital Assistant", by Jon Hulak, *Business Communications Review*, Oct. 1995, pp. 45–48.

"Managing contacts in Windows 95", by Kevin O'Connor and Maheem Zaman, *PC User*, Apr. 1996, p. 79.

"The CallManager system: A platform for intelligent telecommunications services", by David J. Pepper, Sharad Singhal and Scott Soper, *Speech Communications*, 23 (1997) pp. 129–139.

"Method for Personal Digital Assistance Calendar Expert Nomenclature", IBM Technical Disclosure Bulletin, vol. 37, No. 03, Mar. 1994, p. 481.

*Primary Examiner*—Zarni Maung
*Assistant Examiner*—Khanh Quang Dinh
*Attorney, Agent, or Firm*—Joseph R. Kelly; Westman, Champlin & Kelly P.A.

[57] ABSTRACT

A desktop computer and a mobile device both contain personal information management systems, such as electronic mail applications. Objects maintained by the electronic mail applications are synchronized between the desktop computer and the mobile device such that attachments to electronic mail messages are receivable by the mobile device. The present invention also allows the user of the mobile device to dynamically retrieve individual electronic mail message attachments on a per message basis. Further, filtering techniques can be implemented such that, during synchronization, only predetermined attachments are automatically provided to the electronic mail message object store on the mobile device.

22 Claims, 7 Drawing Sheets

ELECTRONIC MAIL OBJECT SYNCHRONIZATION BETWEEN A DESKTOP COMPUTER AND MOBILE DEVICE

REFERENCE TO CO-PENDING PATENT APPLICATION

The present application claims priority from and fully incorporates herein, U.S. provisional patent application Ser. No. 60/063,164 entitled "FEATURES OF A MOBILE DEVICE AND ASSOCIATED COMPUTER", filed on Oct. 24, 1997, and Ser. No. 60/064,986, entitled "FEATURES OF A MOBILE DEVICE AND ASSOCIATED COMPUTER", filed on Nov. 7, 1997.

Reference is also hereby made to the following co-pending U.S. patent applications: Ser. No. 08/944,948 filed on Oct. 2, 1997, entitled "OBJECT SYNCHRONIZATION BETWEEN OBJECT STORES ON DIFFERENT COMPUTERS", assigned to the same assigned as the present application. The referenced patent application is hereby fully incorrorated by reference.

Ser. No. 09/177,158 filed on even date herewith, entitled "SYSTEM AND METHOD FOR INTERACTION BETWEEN A DESKTOP COMPUTER AND MULTIPLE MOBILE DEVICE", which is assigned to same assignee as the present invention and hereby incorporated by reference.

BACKGROUND OF THE INVENTION

Mobile devices are small electronic computing devices often referred to as personal digital assistants. One such mobile device is the Handheld PC (or "H/PC") based on and including the Windows CE operating system sold by Microsoft Corporation of Redmond, Wash. While a wide variety of computing tasks and applications can be performed by such mobile devices, personal information managers (PIMs) are particularly well suited to mobile devices.

PIMs typically comprise applications which enable the user of the mobile device to better manage scheduling and communications, and other such tasks. Some commonly available PIMs include scheduling and calendar programs, task lists, address books, and electronic mail (e-mail) programs. Some commonly commercially available PIMs are sold under the brand names Microsoft Schedule+ and Microsoft Outlook and are commercially available from Microsoft Corporation of Redmond, Wash.

It is also common for mobile devices to be used in conjunction with one or more desktop computers. For example, the user of a mobile device may also have access to, and use, a desktop computer at work, at home, or both. A user may typically run the same types of PIMs on both the desktop computer and the mobile device (although the particular versions of the PIMs may be somewhat different from the desktop computer to the mobile device). Thus, it is quite advantageous for the mobile device to be designed to be coupleable to the desktop computer to exchange information with, and share information with, the mobile device.

The user may also typically make changes to the PIMs both on the mobile device, and at the desktop. Therefore, it is advantageous for the PIMs on both the mobile device and the desktop to contain the most up-to-date information, regardless of whether recent changes to the PIMs have been made on the mobile device or the desktop computer. The process of coupling the mobile device with the desktop computer, and integrating the information stored by the PIMs on the mobile device and the desktop computer such that the two contain the same updated information is referred to as synchronization.

Conventional PIMs which support electronic mail messaging commonly provide the ability for the sender of an electronic mail message to electronically attach a document or other file to the electronic mail message such that the attachment is sent along with the electronic mail message to the recipient of the electronic mail message. Some prior mobile devices have been designed to allow the synchronization of electronic mail messages. However, to date, that synchronization has been directed to the electronic mail messages only, without the attachments. In other words, during synchronization of electronic mail messages, the attachments have conventionally been stripped out of the electronic mail transfer such that the user of the mobile device only receives the electronic mail message itself, with the attachments being stripped out of that message and inaccessible by the user of the mobile device.

A number of significant obstacles present themselves when dealing with the transfer of electronic mail messages in the environment which defines the interaction between the desktop computer and a mobile device. First, typical mobile devices have significantly limited amounts of memory relative to a desktop computer. Attachments supported by conventional PIMs may commonly not simply be text files, or documents, but may also be more memory intensive files, such as drawings, graphs, charts, and so on. Therefore, synchronization of attachments to electronic mail messages presents difficult questions with respect to memory capacity. Also, providing an adequate electronic mail address book without dominating mobile device memory presents problems.

Further, many attachments may be unneeded by the user of the mobile device, unless the user is at the desktop. In other words, the user may not desire to (and indeed may have no use to) observe many attachments, unless the user is at the desktop where the user can view the attachments and act on the attachments in that environment.

In addition, some users may receive electronic mail messages from sources which the user does not desire to synchronize with the desktop computer. For example, if the ability were provided to couple the mobile device to more than one other computing device, the user may not wish to synchronize all information on both other computing devices and the mobile device. Thus, appropriate discrimination among messages presents problems as well.

SUMMARY OF THE INVENTION

One aspect of the present invention arises, at least in part, from the notion that some users find it highly desirable to view all attachments, or at least some attachments received along with electronic mail messages at the desktop computer. In addition, the present invention arises, at least in part, from the notion that it may be desirable for the user of the mobile device to receive only certain attachments to electronic mail messages, chosen by the user dynamically on an ad hoc basis, or chosen according to preselectable filtering criteria.

A desktop computer and a mobile device both contain personal information management systems, such as electronic mail applications. Objects in the electronic mail applications are synchronized between the desktop computer and the mobile device such that attachments to electronic mail messages are viewable by the mobile device.

While using the mobile device's electronic mail application, the user is able to request individual attachments that have not been downloaded to the device from the desktop computer. During synchronization, a change in the electronic mail message object on the mobile device, which reflects the user's desire to obtain an attachment on the mobile device, is detected by the desktop computer. In response, a synchronization component on the desktop computer manipulates an application programming interface which controls access to the electronic mail message object store on the desktop computer to retrieve the identified attachment. The synchronization component then manipualtes a remote application programming interface, utilized by the object store on the mobile device, to transfer the identified attachment to the electronic mail message object store on the mobile device.

Another aspect of the present invention allows the user of the mobile device to dynamically retrieve individual electronic mail message attachments on a per message basis. Further, filtering techniques can be implemented such that, during synchronization, only predetermined attachments are automatically provided to the electronic mail message object store on the mobile device.

Another feature of the present invention configures the electronic mail messaging application on the mobile device to utilize an application programming interface to retrieve address information from an abridged directory on the mobile device. Further, the mobile device can be configured to employ the same resolution features associated with the desktop computer such that familiar names can be used to address messages at the mobile device in an efficient manner. The present invention also provides a synchronization architecture which alleviates unwanted integration of electronic mail messages, such as integration of electronic mail messages from two or more other computing devices which are couplable to the mobile device.

DETAILED DESCRIPTION OF THE PREFERRED EMBODIMENTS

Figure 1:
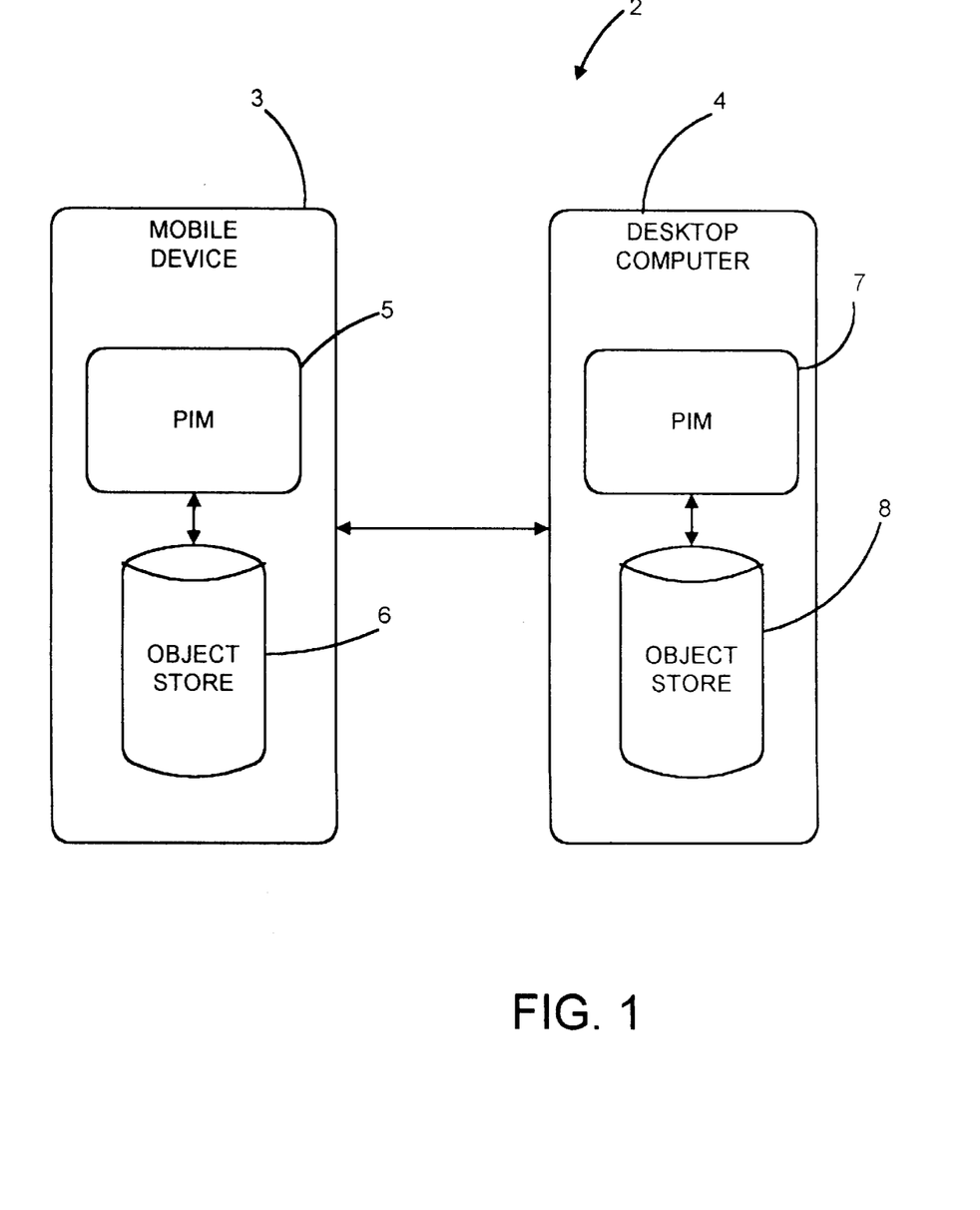
FIG. 1 is a block diagram illustrating a basic environment of the present invention.

FIG. 1 is a block diagram of a typical system or environment 2 in which the present invention operates. Environment 2 includes mobile device 3 and desktop computer 4. Mobile device 3 includes an application program 5 and an object store 6. Desktop computer 4 also includes an application program 7 and an object store 8. Mobile device 3 and desktop computer 4 are connectable by one of a plurality of connection mechanisms 9.

In one preferred embodiment of the present invention, application program 7 on desktop 4 is a desktop electronic mail application or a personal information manager (PIM) which supports electronic mail messaging. Hereinafter, application program 7 will simply be referred to as PIM 7. Of course, PIM 7 can be configured to support a wide variety of other features, such as scheduling and calendar features, task lists, and personalized address books, to name a few. However, for the sake of clarity, only features relating to electronic mail messaging are discussed in detail with respect to the present invention. Object store 8 is a memory which is configured to store a plurality of individual records or objects, each comprising a plurality of fields or properties related to electronic mail messaging. In one preferred embodiment, PIM 7 is a program, such as that available under the commercial designation Microsoft Outlook 97, and object store 8 is configured to store objects, each of which has a plurality of properties associated with electronic mail messaging, such as a sender's name, the recipient's name, text messages, an indication of whether attachments are attached to any given electronic mail message, an indication as to whether an electronic mail message has been sent and received, and possibly other similar properties. Desktop computer 4 executes the application program identified as PIM 7 to maintain objects stored in object store 8.

The application program designed as PIM 5 for mobile device 3 is a similar PIM to that stored on desktop computer 4. Object store 6 on mobile device 3 is configured to store a plurality of individual records or objects, each comprising a plurality of fields or properties related to electronic mail messaging. As with PIM 7, PIM 5 can possibly also support a wide variety of other features. However, for the sake of clarity, only those features related to electronic mail messaging are discussed in detail herein.

In the preferred embodiment, each object in object store 6 comprises the same set of properties stored in object store 8 for related messages, or a subset of those properties. In addition, the objects stored in object store 6 also preferably include properties which indicate whether attachments to electronic mail messages are stored locally on mobile device 3, whether those attachments reside only on desktop computer 4, and whether the user has requested the particular attachment to be copied into object store 6 from object store 8 the next time mobile device 3 is connected to desktop computer 4 through link 9. Mobile device 3 executes PIM 5 to maintain the objects in object store 6.

In the preferred embodiment, each object stored in object store 8 is also stored in object store 6. However, there are actually two instances of each object (one in object store 6 and one in object store 8). Thus, when a user changes one instance of the object stored in either store 6 or store 8, the second instance of that object in the other of stores 6 and 8 is preferably updated the next time mobile device 3 is connected to desktop computer 4 so that both instances of the same object contain up-to-date data. This is referred to as synchronization.

In order to accomplish synchronization, synchronization components run on both mobile device 3 and desktop computer 4. The synchronization components communicate with PIMs 5 and 7 on mobile device 3 and desktop computer 4 through well defined interfaces to manage communication and synchronization.

The synchronization components of mobile device 3 and desktop computer 4 preferably communicate with each other using socket services (such as Winsock services) which may use any suitable, and commercially available, communication link 9, and using a suitable communications protocol. For instance, in one preferred embodiment, mobile device 3 is connectable to desktop computer 4 with a physical cable which communicates using a serial communications protocol. Other communication mechanisms are also contemplated by the present invention, such as infrared (IR) communication, direct modem communication, remote dial-up networking communication, communication through commercially available network cards (i.e., using TCP/IP), remote access services (RAS), wireless modem, wireless cellular digital packet data (CDPD), or other suitable communication mechanisms.

Figure 2:
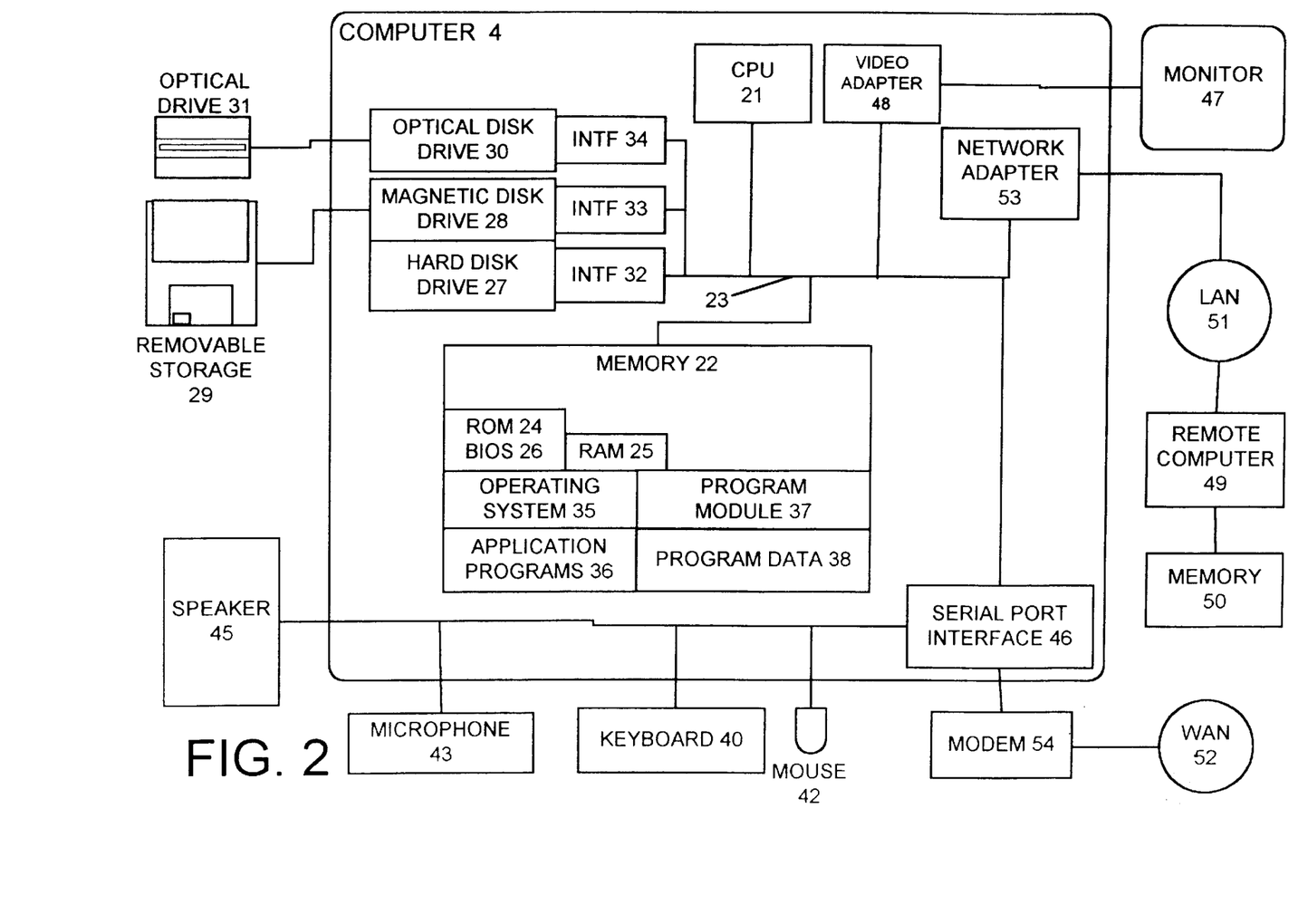
FIG. 2 is a block diagram of one embodiment of a conventional desktop computer used in conjunction with a mobile device in accordance with the present invention.

FIG. 2 and the related discussion are intended to provide a brief, general description of a suitable desktop computer 4 in which portions of the invention may be implemented. Although not required, the invention will be described, at least in part, in the general context of computer-executable instructions, such as program modules, being executed by a personal computer 4 or mobile device 3. Generally, program modules include routine programs, objects, components, data structures, etc. that perform particular tasks or implement particular abstract data types. Moreover, those skilled in the art will appreciate that desktop computer 4 may be implemented with other computer system configurations, including multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 2, an exemplary system for implementing desktop computer 4 includes a general purpose computing device in the form of a conventional personal computer 4, including processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 a random access memory (RAM) 25. A basic input/output system (BIOS) 26, containing the basic routine that helps to transfer information between elements within the desktop computer 4, such as during start-up, is stored in ROM 24. The desktop computer 4 further includes a hard disk drive 27 for reading from and writing to a hard disk (not shown) a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the desktop computer 4.

Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks (DVDs), Bernoulli cartridges, random access memories (RAMs), read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36 (which include PIMs 7), other program modules 37, and program data 38. A user may enter commands and information into the desktop computer 4 through input devices such as a keyboard 40, pointing device 42 and microphone 62. Other input devices (not shown) may include a joystick, game pad, satellite dish, scanner, or the like. These and other input devices are often connected to the processing unit 21 through a serial port interface 46 that is coupled to the system bus 23, but may be connected by other interfaces, such as a sound card, a parallel port, game port or a universal serial bus (USB). A monitor 47 or other type of display device is also connected to the system bus 23 via an interface, such as a video adapter 48. In addition to the monitor 47, desktop computers may typically include other peripheral output devices such as speaker 45 and printers.

The desktop computer 4 may operate in a networked environment using logic connections to one or more remote computers (other than mobile device 3), such as a remote computer 49. The remote computer 49 may be another personal computer, a server, a router, a network PC, a peer device or other network node, and typically includes many or all of the elements described above relative to desktop computer 4, although only a memory storage device 50 has been illustrated in FIG. 2. The logic connections depicted in FIG. 2 include a local area network (LAN) 51 and a wide area network (WAN) 52. Such networking environments are commonplace in offices, enterprise-wide computer network intranets and the Internet.

When used in a LAN networking environment, the desktop computer 4 is connected to the local area network 51 through a network interface or adapter 53. When used in a WAN networking environment, the desktop computer 4 typically includes a modem 54 or other means for establishing communications over the wide area network 52, such as the Internet. The modem 54, which may be internal or external, is connected to the system bus 23 via the serial port interface 46. In a network environment, program modules depicted relative to desktop computer 4, or portions thereof, may be stored in the remote memory storage devices. It will be appreciated that the network connections shown are exemplary and other means of establishing a communications link between the computers may be used.

Desktop computer 4 runs operating system 35 that is typically stored in non-volatile memory 24 and executes on the processor 21. One suitable operating system is a Windows brand operating system sold by Microsoft Corporation, such as Windows 95 or Windows NT, operating systems, other derivative versions of Windows brand operating systems, or another suitable operating system. Other suitable operating systems include systems such as the Macintosh OS sold from Apple Corporation, and the OS/2 Presentation Manager sold by International Business Machines (IBM) of Armonk, N.Y. PIM 7 is preferably stored in program module 37, in volatile memory or non-volatile memory, or can be loaded into any of the components shown in FIG. 2 from a floppy diskette 29, CDROM drive 31, downloaded from a network via network adapter 53, or loaded using another suitable mechanism.

A dynamically linked library (DLL), comprising a plurality of executable functions is associated with PIM 7 for execution by processor 21. Interprocessor and intercomponent calls are facilitated preferably using the component object model (COM) as is common in programs written for Microsoft Windows brand operating systems. Briefly, when using COM, a software component such as a DLL has a number of interfaces. Each interface exposes a plurality of methods, which can be called individually to utilize different services offered by the software component. In addition, interfaces are provided such that methods or functions can be called from other software components which optionally receive and return one or more parameter arguments.

In general, the DLL associated with PIM 7 is designed specifically to work in conjunction with PIM 7 and to expose desktop synchronization interfaces that function according to a synchronization protocol. The DLL, in turn, calls interfaces exposed by PIM 7 in order to access data representing individual properties of objects maintained in object store 8. Object store 8, of course, can reside in any one of the suitable memory components described with respect to FIG. 2.

Figure 3:
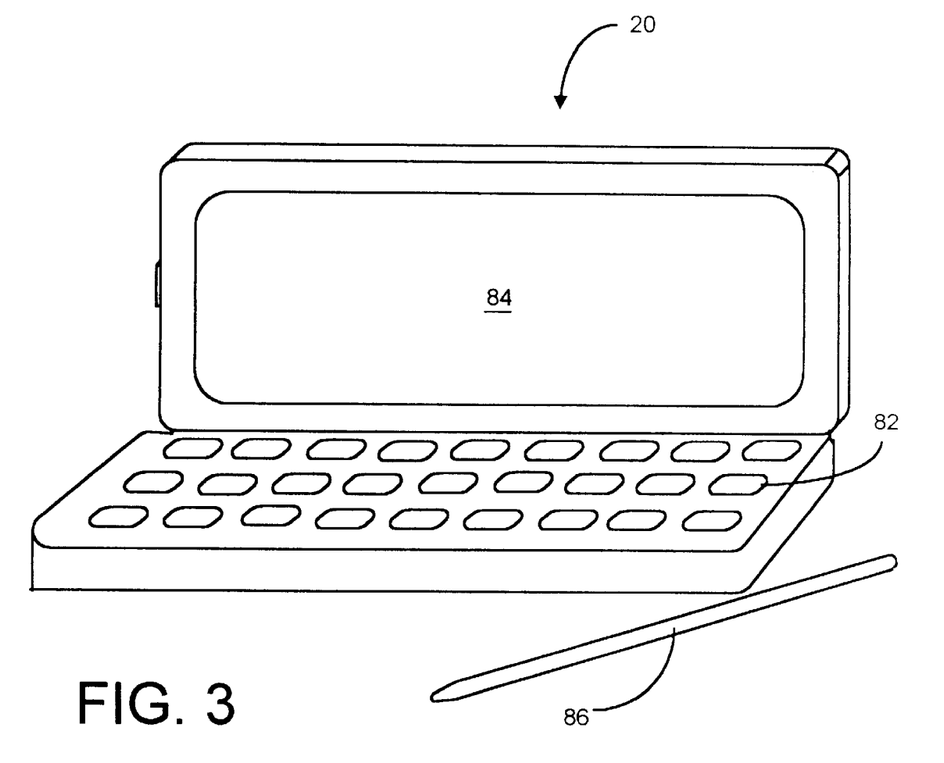
FIG. 3 is a simplified pictorial illustration of one embodiment of a mobile device in accordance with the present invention.

FIG. 3 is a pictorial illustration of one preferred embodiment of a mobile device 3 which can be used in accordance with the present invention. Mobile device 3, in one preferred embodiment, is a desktop assistant sold under the designation Handheld PC or H/PC based on a Windows CE operating system provided by Microsoft Corporation. Mobile device 3 has some components which are similar to those of desktop computer 4. For instance, in one preferred embodiment, mobile device 3 includes a miniaturized keyboard 82, display 84, and stylus 86.

In the embodiment shown in FIG. 3, display 84 is a contact sensitive liquid crystal display (LCD) screen which is used in conjunction with stylus 86. Stylus 86 is used to press or contact the display screen 84 at designated coordinates to accomplish certain user input functions. Of course, other user input configurations can be used as well. For example, user input mechanisms could be included such as a keypad, a track ball, and other various types of miniaturized keyboards, or the like. In addition, mobile device 3 may not be embodied as the H/PC brand of desktop assistant, but could also be implemented as another type of personal digital assistant (PDA), another personal organizer, a palm top computer, or a similar computerized device.

Figure 4:
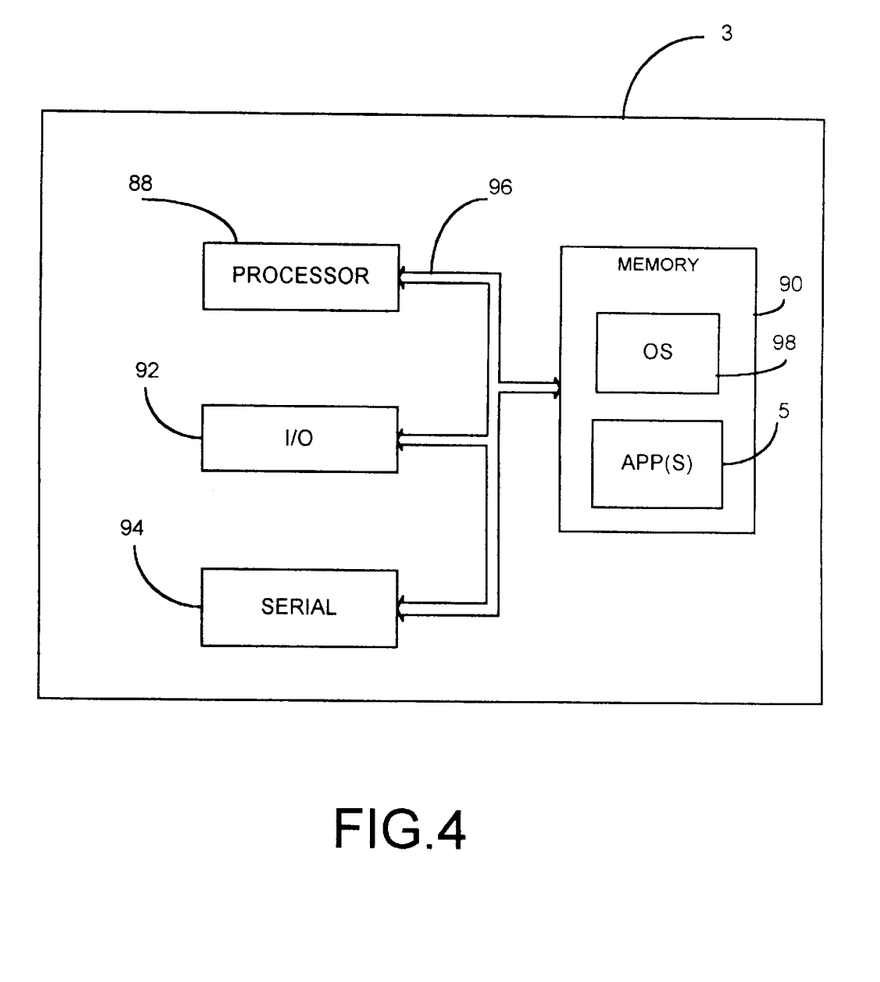
FIG. 4 is a simplified block diagram of one embodiment of the mobile device shown in FIG. 3.

FIG. 4 is a more detailed block diagram of mobile device 3. Mobile device 3 preferably includes microprocessor 88, memory 90, input/output (I/O) components 92 (which include keyboard 82 and touch sensitive screen 84) and serial interface 94. In the preferred embodiment, these components of mobile device 3 are coupled for communication with one another over a suitable bus 96.

In the preferred embodiment, memory 90 is implemented as non-volatile electronic memory such as a random access memory (RAM) and read only memory (ROM) with a battery back-up module (not shown) such that information stored in memory 90 is not lost when the general power to mobile device 30 is shut down. A portion of memory 90 is preferably allocated as addressable memory for program execution, while another portion of memory 90 is preferably used to simulate storage on a disk drive.

Memory 90 includes operating system 98 and application (or PIM) 5. Operating system 98, during operation, is preferably loaded into, and executed by, processor 88 from memory 90. Operating system 98, in one preferred embodiment, is the Windows CE brand operating system commercially available from Microsoft Corporation. The operating system 98 is preferably designed for mobile devices, and implements database features which can be utilized by PIM 5 through a set of exposed application programming interfaces and methods. The objects in object store 6 are preferably maintained by PIM 5 and operating system 98, at least partially in response to calls to the exposed application program interfaces and methods.

It should be noted that PIM 5 is not necessarily designed to be entirely compatible with PIM 7 which executes on desktop computer 4. For instance, there may not be the precise one-to-one matching between the properties of specific object types. Some properties supported by the electronic mail messaging features of PIM 5 may have no corresponding features in PIM 7 on desktop computer 4, and vise versa.

Figure 5:
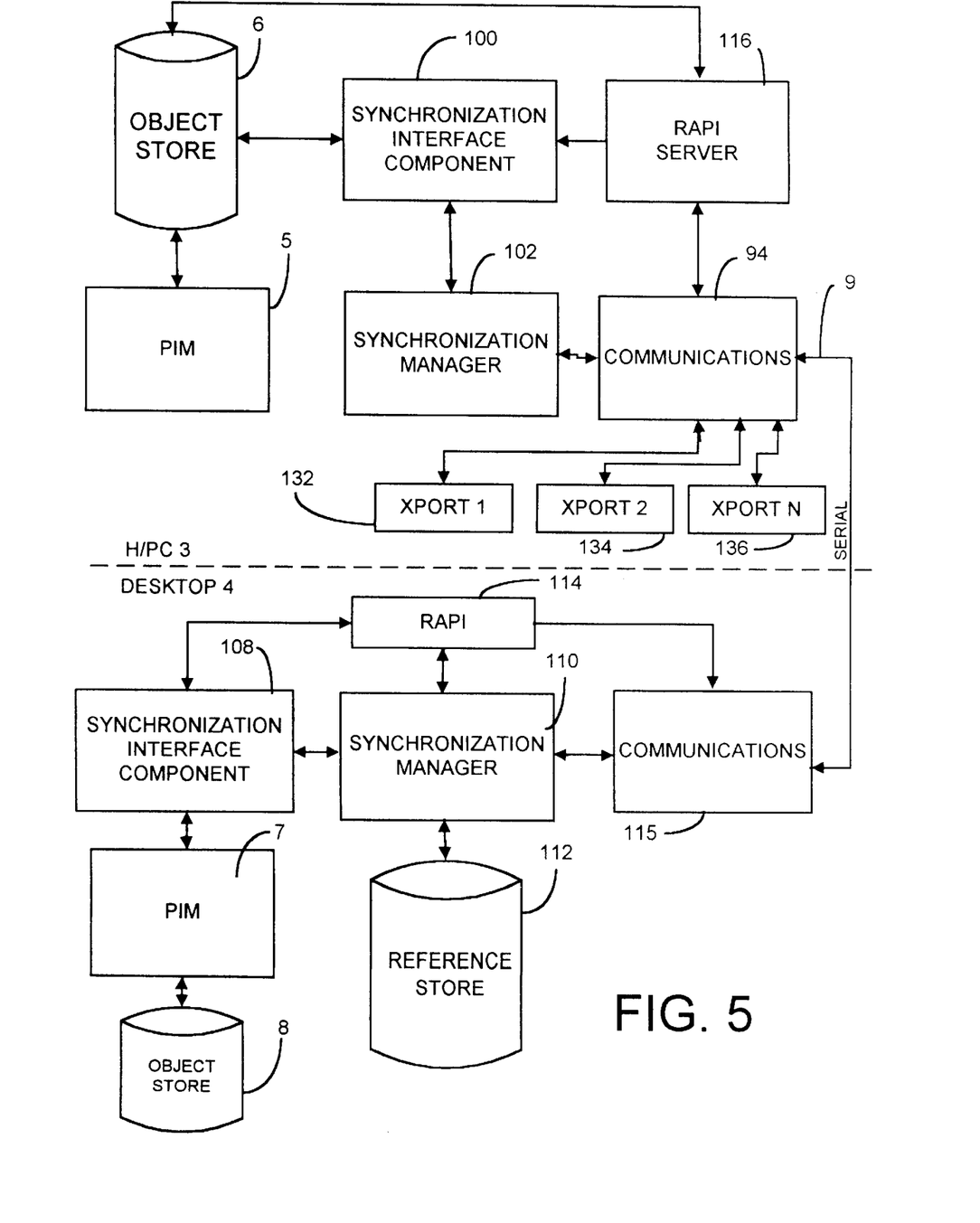
FIG. 5 is an architectural block diagram illustrating one embodiment of portions of the desktop computer shown in FIG. 2 and the mobile device shown in FIGS. 3 and 4 to illustrate synchronization of information stored in object stores on the desktop computer and the mobile device in accordance with the present invention.

FIG. 5 is an architectural block diagram illustrating one preferred embodiment of architectural components of mobile device 3 and desktop computer 4 which are used in synchronizing objects stored in object store 6 on mobile device 3 and object store 8 on desktop computer 4. In addition to PIM 5 and object store 6, mobile device 3 includes synchronization interface component 100, synchronization manager 102, communications component 94, remote application programming interface (RAPI) server 116, and electronic mail messaging transports 132, 134 and 136.

Desktop computer 4 includes, in addition to PIM 7 and object store 8, synchronization interface component 108, synchronization manager 110, reference store 112, RAPI component 114, and communications component 115. Many of the components shown in FIG. 5 are used primarily to implement a suitable synchronization protocol. For the sake of simplicity, one suitable protocol is discussed in this application. Other protocols could be used as well.

Generally, synchronization manager 110 executes on desktop computer 4 and orchestrates synchronization between objects in object store 6 in handheld device 3, and objects in object store 8 in desktop computer 4. Synchronization manager 110 also maintains reference store 112 apart from desktop object store 8 as is described in greater detail below. Synchronization manager 110 implements the synchronization protocol to allow a comparison between corresponding objects stored in object store 6 in mobile device 3 and object store 8 in desktop computer 4, to receive objects from object store 8, and to update objects in object store 8. The synchronization protocol also facilitates the retrieval of objects stored in object store 6 in mobile device 3 through synchronization interface component 100 and synchronization manager 102, as well as communications component 94.

On the side of mobile device 3, the synchronization interface component 100 exposes application programming interfaces which synchronization manager 102 calls to read and store objects and object properties on object store 6. In general, the application programming interfaces allow the creation of databases for different types of objects, and allow application programs to write and read property names and values to and from respective objects within object store 6.

As discussed with respect to FIG. 1, PIM 5 executes on mobile device 3 and maintains object store 6. PIM 7 executes on desktop computer 4 and maintains object store 8. There are many different ways which PIMs 5 and 7 can store objects in object stores 6 and 8. However, in a preferred embodiment, PIMs 5 and 7 create a distinct database for each object type. For example, different databases are created for appointments, tasks, electronic mail messages, etc. A predefined set of properties is supported for each object type, and each of the databases is assigned a name by the application program that creates it.

In an alternative embodiment, the application programs in PIMs 5 and 7 may use a single database for all object types, with the first property of each object defining the type of object. In any case, objects are uniquely identified within mobile device 3 and desktop computer 4 by object identifiers which are independent of the names assigned by the application programs creating the object.

Synchronization manager 110 is not necessarily closely associated with PIM 7. Rather, it is an independent component which synchronizes objects from any application program that supports the appropriate desktop synchronization interfaces. Communication components 94 and 115 implement serial communications between the computers using suitable link 9. Synchronization manager 110 communicates with PIM 7 and accesses object store 8 through synchronization interface component 108. Synchronization interface component 108 corresponds generally to a DLL discussed with respect to FIG. 2 above, and exposes one or more application program interfaces and methods. The interfaces and methods are preferably of the form known as store interfaces such as IreplStore and IreplObjHandler developed and published by the Microsoft Corporation for Windows brand operating system platforms. Those interfaces may, in turn, use interfaces such as messaging application programming interfaces (MAPI) and/or OLE Automation (or any other application programming interface) to communicate with the underlying PIM and object store. In one preferred embodiment, the MAPI exposed by component 108 is a C-language application programming interface which allows programmable access to features of an electronic mail messaging program known as MS Mail also commercially available from the Microsoft Corporation. In another preferred embodiment, the MAPI exposed by component 108 is a component object model based (COM-based) set of interfaces which is sometimes referred to as extended MAPI and includes a set of automation interfaces to messaging systems, for use in Visual Basic and the like. However, synchronization interface component 108 and the associated application program interfaces and methods can be any suitable synchronization interface components designed for any particular application in PIM 7. Because the application program interfaces are preferably standardized, they allow synchronization manager 110 to access and synchronize any number of different desktop PIMs, as long as the required interface methods are implemented for each PIM.

Reference store 112 provides a mapping between instances of objects stored in object store 6 on mobile device 3 and objects stored in object store 8 on desktop computer 4. Since the same object identifiers are not used by PIM 5 to identify objects on object store 6 as are used by PIM 7 to identify objects in object store 8, this mapping is required.

Synchronization manager 110 maintains reference store 112 so that reference store 112 contains the identifying data segments corresponding respectively to a plurality of object instances in object store 8 on desktop computer 4 that are to be synchronized with instances of the same object in object store 6 on mobile device 3. The identifying data segments are updated each time corresponding object instances have been synchronized.

The exact composition of an identifying data segment which is used to identify the particular object instances are assignable by the developer of the desktop synchronization interface component 108, and are then handled and stored by synchronization manager 110. The identifying data segments preferably include some sort of time stamp information which can be compared to determine whether an object has changed since the identifying data segment was last recorded in reference store 112. In addition to maintaining a plurality of identifying data segments, synchronization manager 110 also maintains a list of object identifiers corresponding to objects maintained in object store 6. These identifiers are provided to synchronization manager 110 whenever a new object is added to object store 6 on mobile device 3.

The exact protocol by which full synchronization is accomplished with the present system is described in greater detail in the above referenced patent application. However, a brief discussion of that protocol is helpful in understanding the context of the present invention. In order to synchronize objects, synchronization manager 110 first creates two lists of handles which refer to particular objects. The term "handle" refers to a number or other identifier that can be used to uniquely identify an object and to access the object. Generally, a handle is valid for a particular time period or session, such as during the time when an object has been "opened." If the same object is opened again, its handle may be different.

The first list of handles is obtained from reference store 112 and is indicative of objects which have been synchronized in the past and are identified in reference store 112. The second list of handles is a list which identifies the objects stored on object store 8. The two lists of handles are compared against one another to determine whether the same objects are stored in reference store 112 and object store 8.

If an object is identified in reference store 112, but not in object store 8, that particular object has been deleted from the desktop 4 since the last synchronization. On the other hand, if an object is identified in object store 8, but it does not appear in reference store 112, then it has been added to the desktop since the last synchronization. In either case, synchronization manager 110 determines how to handle the object. In one preferred embodiment, those objects which have been deleted from desktop object store 8 are also deleted from reference store 112. Further, those which have been added to object store 8 are also added to reference store 112.

Synchronization manager 110 then determines whether any of the objects stored in object store 8 have been modified at the desktop since the last synchronization. In other words, if handles corresponding to the same object appear in both object store 8 and reference store 112, but they are not identical (such as the time stamp, a revision number, or another suitable identifying segment is not the same) that indicates that the object in object store 8 has been modified since the last synchronization.

Synchronization manager 110 then determines whether any objects stored in object store 6 on mobile device 3 have been added or modified since the last synchronization. To determine whether an object has been added to object store 6, synchronization manager 110 compares the list of objects in reference store 112 (which reflects all objects at the last synchronization) with a list of objects on object store 6 maintained by synchronization manager 102. To determine whether an existing object has been modified, synchronization manager 102 is configured to maintain a status bit associated with each object stored in object store 6. The status bit reflects whether the particular object associated with that bit has been changed since the last synchronization. If so, synchronization manager 102 notifies synchronization manager 110 of that change if device 3 is then coupled to desktop computer 4, or simply logs the status bit and sends it to synchronization manager 110 the next time device 3 is coupled to desktop computer 4.

It should be noted that none of these procedures require either synchronization manager 110 or synchronization manager 102 to be aware of the particular nature or format of the identifying data segments or of the objects to which they correspond. Rather, interface components 100 and 108 are called upon for all actions that depend upon the actual content of the identifying data segments, and the content of the objects. It is up to the designer of those interfaces to define a format for the identifying data segments that allows the interfaces to perform their required functions.

Once the changes, additions and deletions are determined by synchronization manager 110, the items are synchronized. In order to do this, synchronization manager 110 forms a list of objects which have been changed on either object store 8 or object store 6 and simply calls upon the respective synchronization interface components to update the outdated object. If the same object has been modified both on mobile device 3 and desktop computer 4, a conflict arises. Synchronization manager 110 resolves the conflicts by either prompting the user, or referencing profile information entered by the user during a set-up procedure which dictates which device the user wants to take precedence over the other, and in which instances.

Where an object has either been created at the desktop computer 4 or in the mobile device 3, that object needs to be exchanged with the other device. In the instance where mobile device 3 needs to obtain a new object from desktop computer 4, synchronization manager 110 calls an interface method known as "Set-Up" which specifies a handle for the object to be obtained from object store 8 in desktop computer 4 and transferred to object store 6 in mobile device 3. Once the handle is obtained, the method known as "Get-Packet" is called repeatedly to retrieve a data stream which represents the object, and which is formatted by interface component 108. Synchronization manager 110 simply treats the data as a data stream which is retrieved and sent over link 9 to synchronization manger 102, and eventually to object store 6. The appropriate synchronization interface component 100 parses the data stream in order to identify certain property values associated with properties corresponding to the object. Those properties are then stored in the object store 6.

Finally, synchronization manager 110 updates the identifying data segments associated with either synchronized or exchanged objects and stores the updated data segments in reference store 112.

The present invention also provides the ability to synchronize attachments to electronic mail messages. The present invention provides synchronization of objects associated with electronic mail messages as well as other objects maintained by PIMs 5 and 7. Thus, using the above synchronization protocol, objects associated with electronic mail messages are synchronized during the synchronization process. Synchronization manager 110 detects any new objects in object store 8 which represent new electronic mail messages and causes those objects to be transferred to object store 6 on mobile device 3 for attention by the user of mobile device 3.

Further, if the user composes an electronic mail message on mobile device 3 using an appropriate electronic mail messaging application in PIM 5, that electronic mail message is stored as a new object in object store 6. During synchronization, that new object is transferred to desktop computer 4 and object store 8. In the preferred embodiment, a particular application in PIM 7 undertakes to immediately send that electronic mail message from desktop computer 4 using an appropriate electronic mail messaging transport. Of course, if the electronic mail message cannot be immediately sent, it is stored in object store 8 for later transmission.

Once the message is sent, PIM 7 preferably indicates the message has been sent by placing it in a different location (e.g., from the outbox to the sent items box in an e-mail PIM), or otherwise indicates that the message has been sent such as by updating a status property associated with the object to indicate that the message has been sent. This property may optionally be supported by the PIM 5 on mobile device 3 as well.

The objects which represent electronic mail messages typically contain a property which indicates whether an attachment has been attached to the electronic mail message as it was received at desktop computer 4. Thus, during synchronization, this property is transferred to mobile device 3, and eventually object store 6, along with the electronic mail message object which reflects the substance of the electronic mail message. As described above, such attachments can take substantially any form. They can be text files which represent a document, or they can be other types of files which represent drawings, figures, tables, graphs, etc. Therefore, it may not be desirable for the user of mobile device 3 to have all attachments automatically transferred to object store 6 during synchronization, as the attachments could easily dominate the storage capacity of mobile device 3.

Figure 5A:
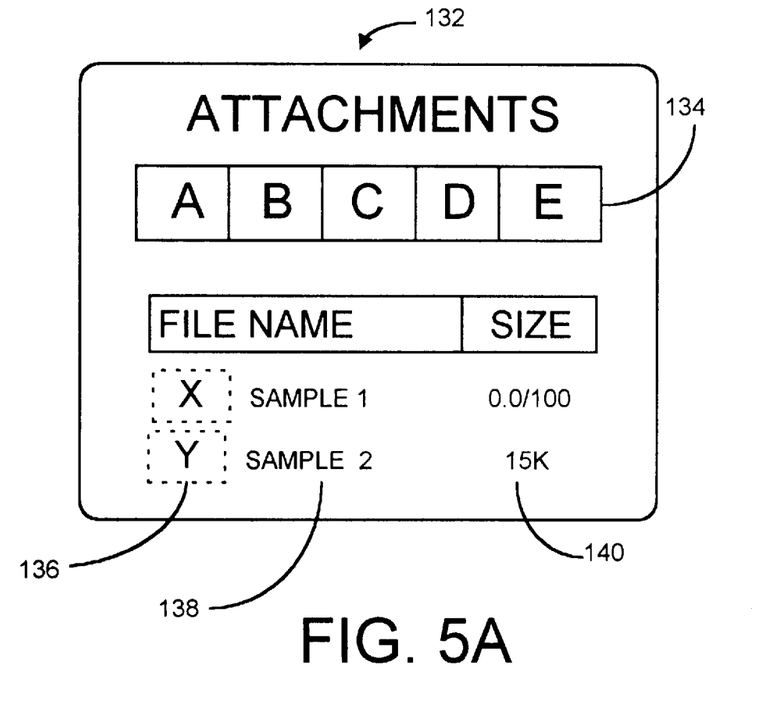
FIG. 5A illustrates one embodiment of a user interface in accordance with the present invention.
Figure 6:
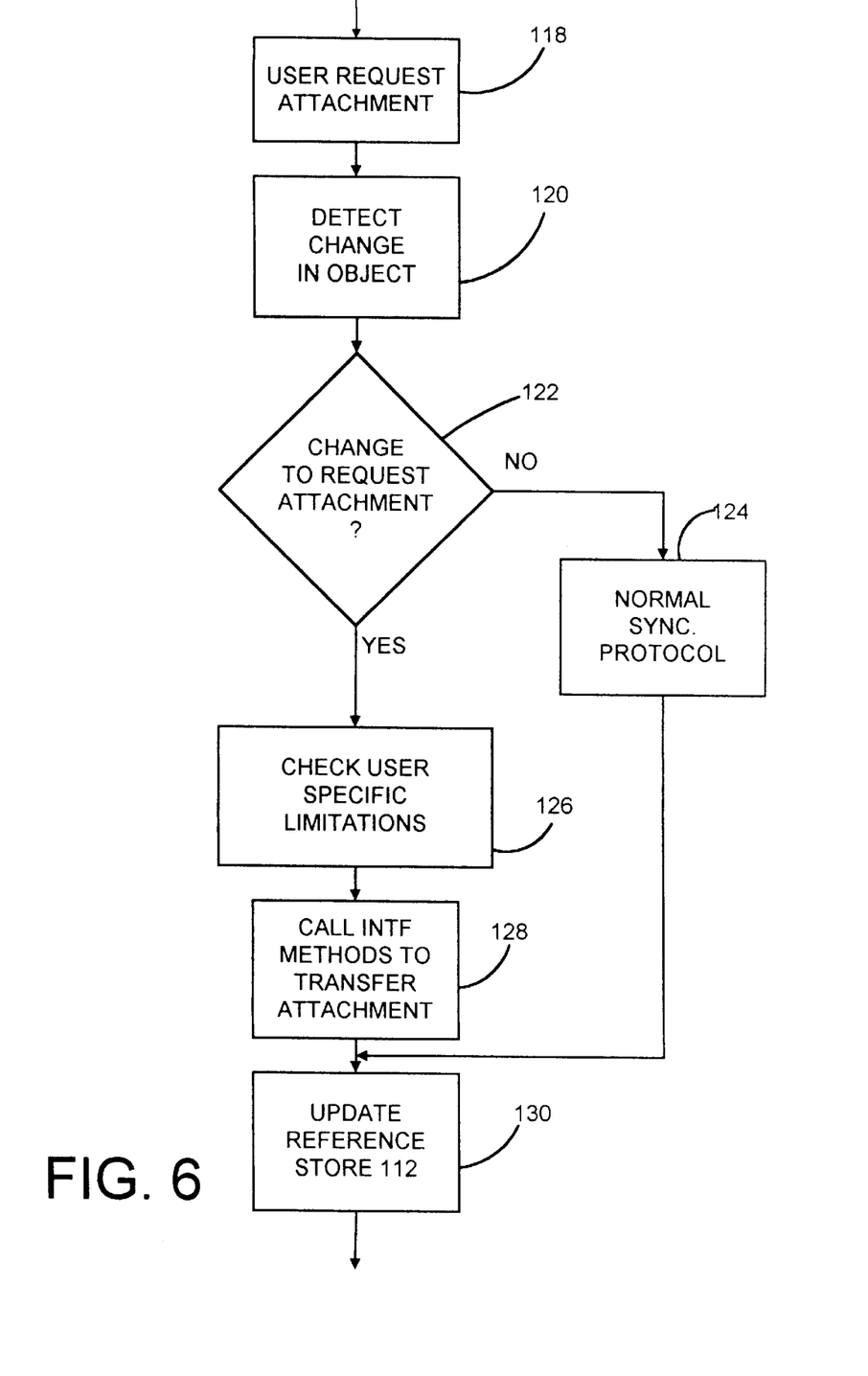
FIG. 6 is a flow diagram illustrating the transfer of attachments in accordance with one embodiment of the present invention.

Therefore, the present invention allows the user of mobile device 3 to either select a parameter in the user profile to automatically send all attachments, only some or none. If none are to be sent automatically, the user can select only those attachments which are desired. FIG. 5A illustrates one embodiment of a user interface (UI) 132 used in accordance with the present invention. FIG. 6 is a flow diagram which illustrates the transfer of attachments in accordance with one preferred embodiment of the present invention. The following description will proceed with respect to FIGS. 5, 5A and 6.

Recall that mobile device 3 includes an operator input mechanism, such as touch sensitive screen 84 and stylus 86. When the user is viewing electronic mail messages (which are maintained and which are caused to be displayed by PIM 5) the object associated with the mail message typically contains a property which causes a visual indication to be provided to the user which indicates whether any attachments were provided along with the electronic mail message. If the user contacts that visual indication on screen 84, PIM 5 causes the attachment property to be modified in the object associated with the electronic mail message stored in object store 6, and also changes the visual indication provided to the user. This is indicated by block 118.

FIG. 5A illustrates one embodiment of user interface (UI) 132 which reflects this visual indication. UI 132 is preferably displayed on screen 84. Command bar 134 preferably includes a plurality of commands actuable by the user, and labeled A–E in FIG. 5A. In a preferred embodiment, the commands include an add-file command which allows the user to add a file to be downloaded during the next synchronization. The tool bar also preferably includes an open file command which allows the user to open any files then displayed by UI 132. Command bar 134 also preferably includes a copy file command which allows the user to specify a name and file to be copied from the mail store to a new location. Command bar 134 also preferably includes a move file command which allows the user to specify a location or name, and a file, which is then moved from the mail store to the new location. A confirmation dialog is then preferably displayed before the moving task is completed. Command bar 134 also preferably includes a delete command which allows the user to select a file to be deleted. In each case, in accordance with one preferred embodiment of the present invention, the user selects any of the commands by simply contacting screen 84 with stylus 86.

Attachment indicator field 136 indicates the presence of an attachment to any electronic mail message displayed under file name field 138. Preferably, items displayed in attachment field 136 indicate whether the attachment is scheduled to be downloaded at the next synchronization.

File name field 138 preferably displays the file name in at least two different formats. When displayed in a first format, such as in italics, that indicates that the attachment to that particular message is not local to mobile device 3. When displayed in block text, for example, that indicates that the attachment has been downloaded, and is resident on mobile device 3.

The size field 140 indicates the size of the attachment. If the attachment is resident on mobile device 3, the size field shows the size of the document. If the attachment is not resident on mobile device 3, the size field shows that no current memory is consumed by the attachment, and also shows the size of the attachment.

Where an attachment has not been chosen to be downloaded, but where the user of mobile device 3 wishes to have the attachment downloaded during the next synchronization, the user simply contacts screen 84 (or double taps a designated portion of the screen) 84 with stylus 86 over the file name field 138, or the attachment field 136. This causes the attachment indicator displayed in attachment indicator field 136 to change appearance formats to indicate that the attachment has now been selected for downloading during synchronization. Thus, UI 132 provides a very efficient mechanism by which a user can dynamically select certain attachments to be downloaded during a next synchronization.

During the next synchronization, synchronization manager 110, in accordance with synchronization protocol discussed above, detects a change in the object associated with the particular electronic mail message which has been modified by the user. The change is due to the fact that the attachment property was modified by the user when the user contacted screen 84, and a new time stamp or revision number was then associated with that object when PIM 5 stored the modified object in object store 6. This causes synchronization manger 102 to set the status bit associated with that object and communicate that status bit to synchronization manager 110 during synchronization. This is indicated by block 120.

Synchronization manager 110 then calls the particular interface methods in component 108 to synchronize the particular object for which the attachment property was modified by the user. However, rather than simply updating the object in object store 8, synchronization interface component 108 determines whether the particular object which has been modified is an electronic mail message with an attachment property. If so, synchronization interface component 108 determines whether it is the attachment property which has been modified to request an attachment. This is done by parsing the data stream received from mobile device 3 into the various property values associated with the object. If it is not the attachment property which has been modified, then synchronization interface component 108 simply continues with the normal synchronization protocol and updates the object in object store 8. This is indicated by blocks 122 and 124.

If, however, synchronization interface component 108 determines that it is the attachments property which has been modified by the user, synchronization interface component 108 can optionally check the registry maintained by the operating system in desktop computer 4 to determine whether the particular user of mobile device 3 has indicated in user profile information any specific actions to be taken in sending attachments. For example, during an initialization proceeding at desktop 4, the user can set profile parameters which indicate that a specific file converter is to be invoked to convert any attachment to be transferred to mobile device 3 into a format that is understandable by the device. This is indicated by block 126.

After determining that an attachment is to be transferred to mobile device 3, and after optionally checking profile information associated with the user of mobile device 3, synchronization interface component 108 calls the necessary interface methods associated with RAPI component 114 to transfer the attachment to RAPI server 116 and eventually object store 6. This is indicated by block 128. Again, the particular interfaces, methods and interaction of RAPI component 114 and RAPI server 116 are preferably implemented in accordance with a well known and publicly documented specification commercially available from the Microsoft Corporation.

After the transfer is completed, synchronization manager 110 updates reference store 112 to contain the appropriate identifying information associated with the object representing the electronic mail message which was modified by the user. This is indicated by block 130.

Another problem can also exist when synchronizing electronic mail messages stored in the in-box of mobile device 3 with those stored in the in-box of desktop computer 4. For example, mobile device 3 can potentially be coupleable to more than one desktop computer 4. If the user of mobile device 3 has a desktop computer at home, and a desktop computer at work, for instance, mobile device 3 will likely be periodically coupled to both of those computers. If the objects from the in-boxes of both of those desktop computers are automatically synchronized with the objects in the in-box on mobile device 3, the result will be that eventually both desktop computers, and mobile device 3 will all have all of the messages in the in-boxes of both of the desktop computers. In other words, if the user of mobile device 3 connects the device to the home desktop computer, the home desktop computer will synchronize the in-boxes such that the in-box of mobile device 3 contains all objects in the in-box of the home desktop computer. Then, when the user connects mobile device 3 to the desktop computer at work, the desktop computer at work will recognize that a number of objects have been added to object store 6 (all of the electronic mail messages in the in-box from the personal computer at home) and will add those objects to the in-box of the desktop computer at work, in object store 8. Thus, all of the electronic mail messages in the in-box of the home computer will be copied to the desktop computer at work. The same is true for all of the electronic mail messages received at work (i.e., they will be copied to the in-box of the desktop computer at home). Similarly, mobile device 3 will contain all messages from the in-boxes of both desktop computers. Therefore, the present invention provides a number of individualized filtering options to prevent unwanted duplication and proliferation of electronic mail messages.

Recall that synchronization manager 110 is configured to generate a list which identifies new objects that have been added to object store 6 on mobile device 3. In one preferred embodiment, synchronization manager 110 is also configured to determine whether those new objects are contained in the in-box of mobile device 3. If so, that means that mobile device 3 has an electronic mail message in its in-box where no corresponding mail message is in the in-box of desktop computer 4 (because the object associated with the message in the in-box of mobile device 3 does not correspond to an object in object store 8 on desktop computer 4). If that is the case, synchronization manager 110 simply does not synchronize that object, and hence does not copy the mail message from the in-box of mobile device 3 to the desktop computer 4.

In another preferred embodiment, the synchronization of mail messages from the in-box of mobile device 3 is filtered based upon the specific transport used to receive the electronic mail message. In other words, mobile device 3, in accordance with one aspect of the present invention, is provided with a plurality of transports 132, 134, and 136. Those transports may include, for instance, a POP3 transport, a Skytel paging transport, or any other commercially available transport. Such transports are typically supported by different applications in PIM 5.

Electronic mail objects associated with electronic mail messages received through such transports typically contain a property, or tag, which specifically identifies the particular transport through which the electronic mail message was received. In one preferred embodiment, synchronization manager 110 is configured to not only create a list of new objects on mobile device 3, but also to examine those objects to determine whether they are electronic mail messages, and, if so, which transport they were received on. If that transport does not correspond to the transport then being used by desktop computer 4 (or any other set of transports specified by the user in profile information stored in the registry maintained by the operating system of desktop computer 4) synchronization manager 110 simply does not synchronize that particular object. Therefore, if the user of mobile device 3 receives personal electronic mail transmissions by one type of transport and receives business or professional electronic mail messages by another type of transport, a particular type of transport can be used to filter synchronization of those messages. Of course, the filtering function can also be carried out by synchronization interface component 108, rather than by synchronization manager 110.

Even when the above filtering techniques are employed, the user can elect to manually transfer any electronic mail messages from desktop computer 4 to mobile device 3. A suitable user interface is simply provided on desktop computer 4 which allows the user to identify those specific electronic mail messages in the in-box of desktop computer 4 or in the in-box of mobile device 3 which the user wishes to transfer. Those objects will then be transferred and synchronized using the normal synchronization protocol. As one example, one such user interface is that shown in FIG. 5A, and another suitable interface is that referred to as a "drag and drop" interface.

Further, another problem can present itself in composing and sending electronic mail messages from mobile device 3. In order to send electronic mail messages, one must typically fully qualify the address of the recipient, or the mail server sending the message will be inadequately informed of the address and will be unable to deliver the message. However, it is also common for users of electronic mail applications to identify familiar names for particular parties to which they send a significant number of electronic mail messages. The familiar name is tagged to the fully qualified address which is then used by the electronic mail system in addressing the message.

It is common, however, for individuals with desktop computers who work in a large corporation or organization to have a full address book which contains the fully qualified electronic mail address for all persons in the corporation or organization. This can potentially consume an enormous volume of memory. To retain such a voluminous address book on mobile device 3 is undesirable. Many users may also retain a greatly abridged address book or contact directory which contains the full name and fully qualified address of certain individuals to whom they send a significant number of electronic mail messages. Such an abridged directory is commonly stored in object store 6 on mobile device 3.

Where the fully qualified address does not appear in the abridged directory, synchronization interface component 108 uses MAPI methods to resolve the address. In other words, MAPI supports a feature by which name fields in various directories can be searched in a predetermined order in order to find an electronic mail address based on a familiar name. Thus, when an object representing an electronic mail transmission to be sent is transferred to desktop computer 4, the same name resolution hierarchy is used by desktop computer 4 in resolving the name and obtaining the fully qualified electronic mail address as if the user had composed the message and sent the message from desktop computer 4. This significantly alleviates the necessity of storing an entire, and potentially voluminous, address book on mobile device 3. Thus, this reduces the necessary storage capacity of mobile device 3.

Although the present invention has been described with reference to preferred embodiments, workers skilled in the art will recognize that changes may be made in form and detail without departing from the spirit and scope of the invention.

What is claimed is:

1. A method of transferring objects, comprising:
providing a first computer including a first application program configured to maintain electronic mail objects, one electronic mail object corresponding to each electronic mail message received by the first computer, the first computer being configured to maintain attachments associated with the electronic mail messages, and the first computer including a first object store configured to store the electronic mail objects;

providing a mobile device, coupled to the first computer, including a second object store, a second application program configured to maintain in the second object store a second electronic mail object corresponding to each electronic mail object synchronized to the mobile device, the second application program being configured to receive the attachments associated with the electronic mail objects synchronized to the mobile device from the first computer;

selecting attachments to be synchronized to the mobile device; and when the mobile device is next coupled to the first computer, transferring to the mobile device the selected attachments associated with the electronic mail objects synchronized to the mobile device.

2. The method of claim 1 wherein selecting attachments includes selecting all attachments and wherein transferring to the mobile device the attachments comprises:

transferring all attachments associated with any of the electronic mail objects synchronized to the mobile device.

3. The method of claim 1 wherein providing a mobile device comprises:

providing the second application program configured to maintain in the second object store a second electronic mail object corresponding to each electronic mail object synchronized to the mobile device wherein the second electronic mail object includes a property having a value indicative of whether the electronic mail message represented by the second electronic mail object includes an attachment.

4. The method of claim 3 wherein transferring to the mobile device the attachments comprises:

transferring preselected attachments to the mobile device.

5. The method of claim 4 wherein transferring preselected attachments comprises:

detecting an alteration in the second electronic mail object indicative of an attachment request; and     when the mobile device is next coupled to the first computer, transferring the attachment to the mobile device based on the attachment request.

6. The method of claim 5 wherein the first application program includes first application program interfaces, wherein the second application program includes second application program interfaces, and wherein transferring the attachment comprises:

communicating with the first application program through the first application program interfaces to retrieve the attachment from the first object store; and     communicating with the second application program through the second application program interfaces to deliver the attachment to the second object store.

7. The method of claim 6 wherein providing the first computer includes providing a synchronization component configured to communicate with the first and second application programs through the first and second application program interfaces, respectively, and wherein detecting an alteration comprises:

detecting the alteration in the second electronic mail object with the synchronization component.

8. The method of claim 7 wherein communicating with the first application program through the first application program interfaces is performed with the synchronization component.

9. The method of claim 7 wherein communicating with the second application program through the second application program interfaces is performed with the synchronization component.

10. The method of claim 5 wherein providing a mobile device comprises:

providing a user interface having attachment indicia indicative of whether the electronic mail message represented by the second electronic mail object includes an associated attachment; and     providing a user input device which provides a user input signal indicative of a request by the user to receive the attachment, the user input signal altering a property associated with the second electronic mail object.

11. The method of claim 1 and further comprising:

before transferring the attachment to the mobile device, accessing, at the first computer, transmission parameters associated with the mobile device; and     transferring the attachment according to the transmission parameters accessed.

12. The method of claim 11 wherein transferring the attachment according to the transmission parameters includes:

retrieving conversion parameters indicative of a desired file conversion to be performed on the attachment; and     performing the desired file conversion on the attachment.

13. A mobile device couplable to a first computer, the first computer including a first application program configured to maintain electronic mail objects, one electronic mail object corresponding to each electronic mail message received by the first computer, a first object store configured to store the electronic mail objects, and a synchronization component configured to synchronize the electronic mail objects from the first object store with objects from a second object store, the mobile device comprising:

a second object store; and a second application program configured to maintain a second electronic mail object corresponding to each electronic mail object synchronized to the mobile device, in the second object store, the second application program being configured to receive and store attachments associated with second electronic mail objects synchronized to the mobile device.

14. The mobile device of claim 13 and further comprising:

a user interface providing attachment indicia indicative of whether the electronic mail message represented by the second electronic mail object includes an associated attachment; and     a user input device providing a user input signal indicative of a command by the user to receive the attachment, the user input signal altering a property associated with the second electronic mail object.

15. The mobile device of claim 14 wherein the first application program includes first application program interfaces and the second application program includes second application program interfaces, and wherein the mobile device is configured to provide the second electronic mail object to the first computer such that the synchronization component recognizes that the property has been altered and communicates with the first application program through the first application program interfaces to retrieve the attachment from the first object store and communicating with the second application program through the second application program interfaces to deliver the attachment to the second object store.

16. A method of transferring data from a first object store to a second object store, comprising:

providing a first computer including a first application program configured to maintain electronic mail objects, one electronic mail object corresponding to each electronic mail message received by the first computer, the first computer including a first object store configured to store the electronic mail objects;

providing a mobile device, coupleable to the first computer, including a second object store, a second application program configured to maintain in the second object store a second electronic mail object corresponding to each electronic mail object synchronized to the mobile device;

when the mobile device is next coupled to the first computer, synchronizing with the mobile device the electronic mail objects from the first computer;

prior to synchronizing, accessing a set of user defined filter parameters; and wherein synchronizing comprises synchronizing the electronic mail objects according to the filter parameters.

17. The method of claim 16 wherein synchronizing according to the filter parameters includes:

creating the second electronic mail object to provide only a user specified number of lines of text associated with the electronic mail message.

18. The method of claim 16 wherein synchronizing according to filter parameters comprises:

synchronizing the electronic mail objects according to a transport type used to transport the electronic mail message and identified in the first electronic mail object.

19. A mobile device coupleable to a first computer, the first computer including a first application program configured to maintain electronic mail objects, one electronic mail object corresponding to each electronic mail message received by the first computer, a first object store configured to store the electronic mail objects, and a synchronization component configured to synchronize the electronic mail objects from the first object store with objects from a second object store, the mobile device comprising:

a second object store;

a second application program configured to maintain a second electronic mail object corresponding to each electronic mail object synchronized to the mobile device, in the second object store; and a plurality of electronic mail transports, each electronic mail transport being suitable for transmitting electronic mail messages.

20. The mobile device of claim 19 wherein the second application program is configured to receive and store attachments associated with second electronic mail objects synchronized to the mobile device.

21. A computer system, comprising:

a first computer including:

a first application program, having first application program interfaces, configured to maintain electronic mail objects, one electronic mail object corresponding to each electronic mail message received by the first computer;

a first object store configured to store the electronic mail objects; and a synchronization component configured to synchronize the electronic mail objects from the first object store with objects from a second object store;

a mobile device, coupleable to the first computer, including:

a second object store;

a second application program, having second application program interfaces, configured to maintain a second electronic mail object corresponding to each electronic mail object, synchronized to the mobile device, in the second object store;

a user interface providing attachment indicia indicative of whether the electronic mail message represented by the second electronic mail object includes an associated attachment;

a user input device providing a user input signal indicative of a command by the user to receive the attachment and the associated electronic mail message, the user input signal altering a property associated with the second electronic mail object; and the synchronization component being configured to recognize that the property has been altered and communicate with the first application program through the first application program interfaces to retrieve the attachment from the first object store and communicate with the second application program through the second application program interfaces to deliver the attachment to the second object store.

22. A method of transferring objects, comprising:

providing a first computer including a first application program configured to maintain electronic mail objects, one electronic mail object corresponding to each electronic mail message received by the first computer, and a first object store configured to store the electronic mail objects;

providing a mobile device, coupleable to the first computer, including a second object store, a second application program configured to maintain in the second object store a second electronic mail object corresponding to each electronic mail object synchronized to the mobile device, the second electronic mail object including a property having a value indicative of whether the electronic mail message represented by the second electronic mail object includes an attachment;

detecting an alteration in the second electronic mail object indicative of an attachment request; and when the mobile device is next coupled to the first computer, transferring the attachment to the mobile device based on the attachment request.

* * * * *

UNITED STATES PATENT AND TRADEMARK OFFICE
CERTIFICATE OF CORRECTION

PATENT NO. : 6,052,735
DATED : April 18, 2000
INVENTOR(S) : Bryce Ulrich, et al.

It is certified that error appears in the above-identified patent and that said Letters Patent is hereby corrected as shown below:

Column 3, line 11, "manipualtes" should be --manipulates--.

Column 4, line 29, "designed" should be --designated.

Column 13, line 35, ")" delete after screen insert after --84)--.

Column 13, line 53, "manger" should be manager--.

Column 16, line 53 "coupled" should be --coupleable--.

Signed and Sealed this

Twenty-fourth Day of April, 2001

Attest:

NICHOLAS P. GODICI

Attesting Officer   Acting Director of the United States Patent and Trademark Office